June 21, 1949.    J. W. BROWN, JR    2,473,633
METHOD OF WELDING FINS TO TUBULAR MEMBERS
BY ELECTRIC RESISTANCE WELDING
Filed March 20, 1946    2 Sheets-Sheet 2
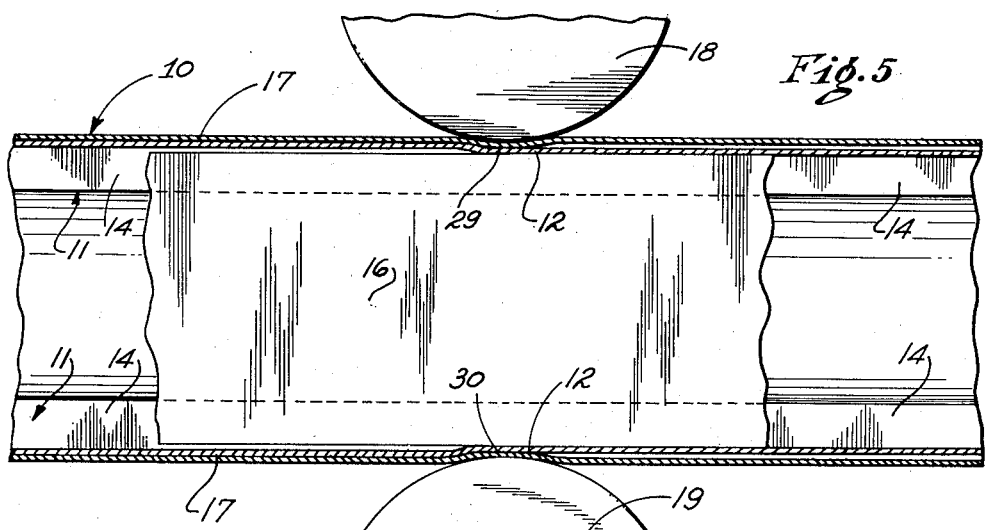
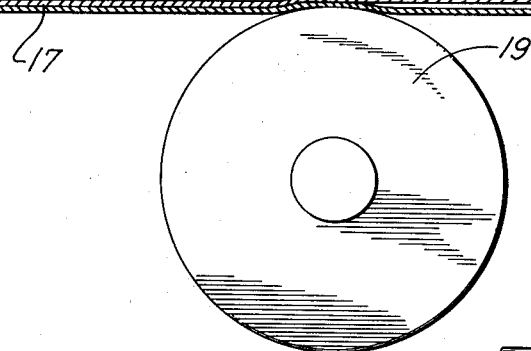
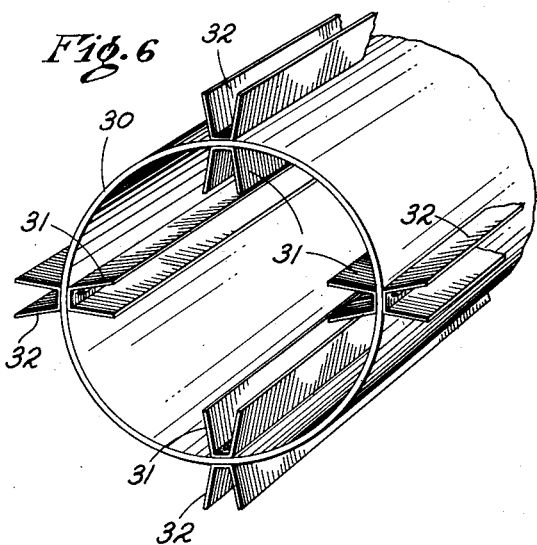
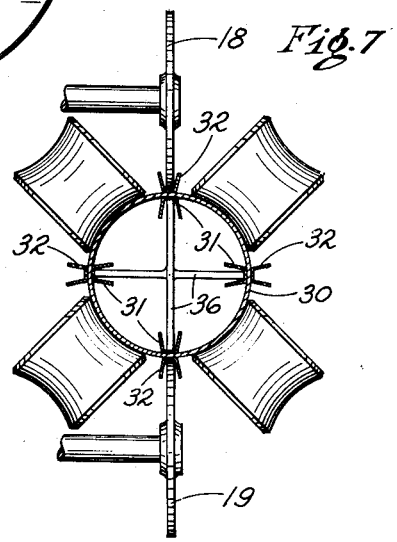
INVENTOR.
JOHN W. BROWN, JR.
BY
Bosworth & Sessions
ATTORNEYS Patented June 21, 1949

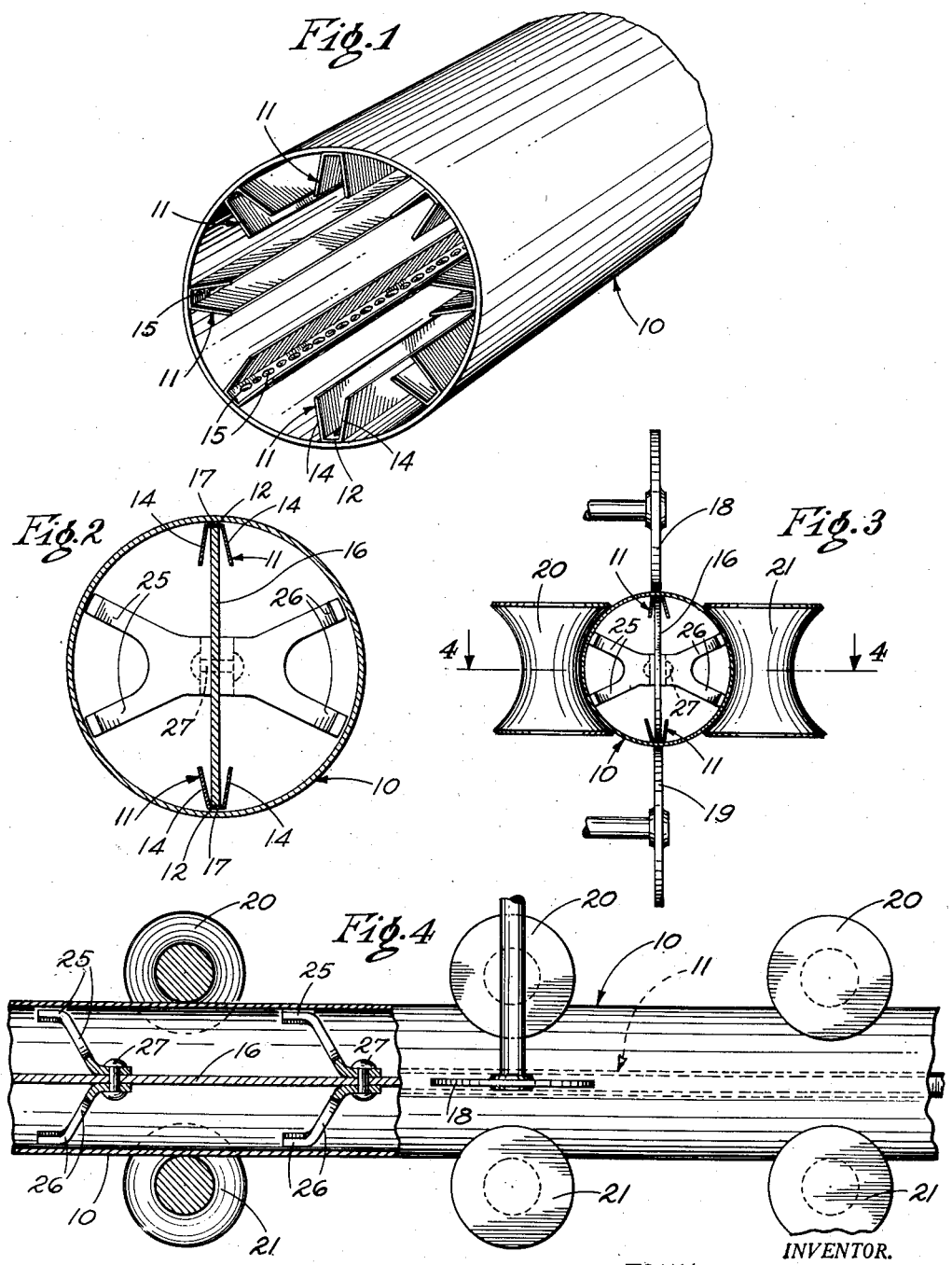

2,473,633

UNITED STATES PATENT OFFICE 2,473,633

METHOD OF WELDING FINS TO TUBULAR MEMBERS BY ELECTRIC RESISTANCE WELDING

John W. Brown, Jr., Lakewood, Ohio, assignor to Brown Fintube Company, Elyria, Ohio, a corporation of Ohio Application March 20, 1946, Serial No. 655,643

8 Claims. (Cl. 219—10)

This invention relates to a method of attaching metallic fin members to the interior of metal tubes for producing internally finned tubes adapted particularly for use as heat exchange conduits.

In the manufacture of heat exchangers of various types, it is desirable to increase the area of the fluid conducting tubes or conduits by securing fins of various types to the interior of tubes. In order to insure proper paths for the flow of heat between the fin members and the walls of the tubes themselves, it is desirable that the fin members be welded to the tubes to provide a continuous metallic path for the conduction of heat. Resistance welds securing the bases of the fin members to the tubes are especially advantageous, but the resistance welding of fins to the interior of tubes and particularly tubes of comparatively small diameter presents difficulties because the tubes are too small to receive electrodes of the type ordinarily employed in conventional resistance welding machines.

A general object of the present invention, is the provision of a method for rapidly and economically welding fins to the inside of tubes without requiring expensive special equipment, the tubes and fins preferably being composed of ferrous material. Another object is the provision of a method which produces tubes having highly desirable characteristics from a heat exchange standpoint.

Preferably I accomplish the above and other objects of the invention by providing a tube of such light gauge with respect to its diameter that the path around the tube between two diametrically opposed points thereon will be of substantial resistance. Within such a tube I position a pair of fin members, for example, channel section members, with their axes extending substantially parallel to the axis of the tube and with the bases of the fin members engaging diametrically opposite inner surfaces of the tube. Between the bases of the fin members, I position a conductor bar or mandrel composed of a highly conductive metal such as copper, and having a thickness such that it will fit within and engage the bases of the channel section fin members. The width of the conductor bar is preferably slightly less than the normal distance between the bases of oppositely disposed fin members, and its length is as great as the length of the fin members to be welded to the tube in a single operation. Thus the conductor bar or mandrel can be a simple rectangular copper bar, machined to the desired dimensions, and preferably provided with centering devices to hold it in proper position within the tube.

The welding operation is carried out by guiding the tube with the assembly of fin members and conductor bar through a suitable welding machine, preferably of the type embodying roller electrodes, by means of a jig or the like engaging the tube somewhat in the manner described and illustrated in my Patent No. 2,298,249, issued October 6, 1942. Pressure is exerted by the welding rolls against the exterior of the tube in the zone just outside the zones of engagement of the fin members with the interior of the tube in sufficient amount to deform the tube inwardly, urging the tube against the bases of the fin members and the bases of the fin members against the conductor bar or mandrel. Sufficient force is applied to produce the proper welding pressure between the inner surface of the tube and the bases of the fin members in the zone where the electrodes engage the exterior of the tube. The pressure exerted by the electrodes must exceed the minimum welding pressure required by an amount sufficient to deform the tube in the manner described above. Current is then caused to flow in the usual manner between the electrodes, an intermittent, alternating current controlled by a control of the thyratron type preferably being employed, and simultaneously the assembly of tube, fin members and conductor bar is moved with respect to the electrodes to produce a series of resistance welded areas securely joining the bases of the fin members and the inner surfaces of the tube. Preferably, the timing and the speed of movement are correlated with the width of the electrode rolls and the conductor bar and the thickness of the fin members to produce welded areas of the type described and claimed in my Patent No. 2,261,137, issued November 4, 1941, thereby insuring the joining of fin members to the tube by paths which are of sufficient area to provide for the efficient transfer of heat between the fin members and the tube.

In such an operation, the flow of current between the two electrodes is divided between the paths around the circumference of the tube and the path through the bases of the fin members and the intervening conductor bar and it would appear that it would be impossible or at least impractical to produce satisfactory welds under such conditions. However, I have discovered that by controlling the resistance of the tube itself, the welding operation can be carried out without difficulty. Thus, in order to prevent excessive loss of current and to make possible the carrying out of the operation without burning the exterior of the tube where it comes in contact with the electrode, the gauge of the metal of the tube preferably should be as thin as possible, consistent with the requirements for the services to which the tube is to be put. The resistance of the path around the tube between the electrodes increases with the diameter of the tube and is reduced with an increase in thickness of the wall of the tube. In the tube as great a resistance as possible is desirable. The conductor bar extending between the bases of the fin members may be made of a highly conductive material and of such thickness that its resistance is negligible. However, the resistance of the tube itself must be maintained at a substantial value. For example, with a tube of small diameter, i. e., about three-quarters of an inch, the wall thickness of the tube preferably should not exceed .020 inch.

With a tube of greater diameter, for example, four inches in diameter, a wall thickness as great as three thirty-seconds of an inch may be employed. The nature of the materials also has an effect on the size of tube with which my method can be carried out. Generally speaking, I prefer to employ tubes composed of ferrous materials, for their resistance is substantially greater than the resistance of the copper mandrel bar employed within the tube. Stainless steels have greater electrical resistance than ordinary low carbon steels, and thus for a given diameter, the welding operation can be carried out with a greater tube wall thickness for stainless steel tubes than is possible with tubes of ordinary low carbon steel.

Referring now to the drawings, Figure 1 is an end elevation of a preferred form of internally finned tube made according to my invention; Figure 2 is a cross sectional view showing the assembly of tube, fin members and conductor bar before the welding operation has taken place; Figure 3 is a somewhat diagrammatic transverse section showing a tube positioned between welding electrodes; Figure 4 is a plan view, partially in section illustrating the longitudinal relationship of the parts during the welding operation; Figure 5 is a longitudinal section of part of the assembly of Figure 4 on an enlarged scale, diagrammatically showing the effect of the pressure exerted by the electrode rolls; Figure 6 is a perspective view of a modified form of finned tube; and Figure 7 is a view similar to Figure 3, but illustrating the welding of the finned tube of Figure 6.

As shown in Figure 1, a tube embodying my invention may comprise a tube 10 having a plurality of channel section fin members 11 welded to the interior thereof in diametrically opposite pairs. Each fin member comprises a base portion 12 from which project flanges 14. The base portion of each fin member is welded to the interior of the tube by a series of welded areas 15 and the flanges project inwardly from the base portion, providing the tube with the desired extended surface for increasing the rate of heat transfer between a commodity flowing within the tube and the tube itself. The fin members preferably extend substantially parallel to the axis of the tube as shown. Thus the fin members offer little resistance to the flow of fluid within the tube. The tubes may be of any reasonable diameter and length, my method being adapted to the production of lengths of tube several feet long.

While the method may be employed with tubes of relatively large diameter, it finds its greatest value in the production of tubes of small diameters, for example, from three-fourths of an inch or less to five or six inches, i. e., tubes within which it is impractical to use an ordinary welding electrode.

The steps of my preferred method are illustrated somewhat diagrammatically in Figures 2 to 5. As shown in Figure 2, the first step is to assemble a pair of channel section members 11 within a tube with their base portions 12 in engagement with substantially diametrically opposite portions of the interior surface of the tube. These may be held in place by the conductor bar or mandrel 16 which is dimensioned to fit within the channel section fin members, the width of the conductor bar 16 being slightly less than the distance between the two bases 12, providing a slight clearance as indicated at 17. In Figure 2, the clearance is shown as between the upper edge of the conductor bar 16 and the base of the upper fin member 11. In practice, the clearance may be between any of the adjacent surfaces or may be divided between several of the adjacent surfaces, the requirement merely being that the width of the conductor bar plus the thickness of the bases of the two fin members will be slightly less than the inner diameter of the tube, so that the assembly can be inserted readily within the tube with a slight total clearance, say for example a few thousandths of an inch.

The assembly of tube, fin members and conductor bar is then positioned in a suitable welding machine which is not illustrated herein, but which may be of conventional construction, embodying a pair of electrode rolls 18 and 19, the machine being provided with a suitable source of current, suitable controls such as thyratron controls and suitable means for urging the electrode rolls toward each other to create the desired welding pressure. All of these features are well known in the art and will not be described further herein.

In addition to the conventional features, the machine is preferably also provided with guide rolls such as the pairs of rolls 20 and 21 (Figure 3) arranged to guide the tube through the machine and center it with respect to the welding rolls. The rolls 20 and 21 hold the tube in proper position during its progress through the machine, and the fin members may be retained in proper position by engagement with the conductor bar 16, the conductor bar 16 in turn being centered by members 25 and 26 secured to the conductor bar at spaced intervals. The members 25 and 26 are somewhat resilient and engage the inner surface of the tube. By this means, all of the parts are retained in proper position for welding.

The welding operation is carried out by applying sufficient pressure by means of the electrode rolls 18 and 19 to deform the tube 10 into slightly oval form and to create the necessary welding pressure between the bases of the fin members and the inner surface of the tube. The current, controlled in the usual manner, is turned on, and the assembly progressed through the tube preferably by driving the electrode rolls themselves in the usual manner. The welding current thereupon flows from one electrode roll through the wall of the tube in a radial direction into the base 12 of one of the fin members, thence through the conductor 16 to the base 12 of the opposite fin member, through the wall of the tube on the opposite side and to the opposite electrode. The heating effect of the current is at the points of high resistance, where the bases of the fin members contact the inner surfaces of the tube, resulting in the simultaneous production of two welded areas between the inner tube wall and respective fin bases 12.

Part of the current flows around the circumference of the tube as explained above. However, the resistance of the wall of the tube is such that sufficient current can be caused to flow through the intermediate conductor 16 successfully to weld the fin bases to the interior of the tube, provided that the thickness and diameter of the tube are proportioned as described above. The weld is preferably produced by alternating current controlled in the manner described in my prior Patent No. 2,261,137 aforesaid to produce a series of welded areas which may be either overlapping or closely spaced, the arrangement, however, being such as to give the desired area for the conduction of heat in the manner described in my said patent. After one pair of fins has been welded to the interior of the tube, the tube may be indexed and a succeeding pair of fins welded to the interior thereof, the operations being repeated until the desired number of welds and pairs of fins are provided.

It is to be noted that the flow of current in the conductor bar is concentrated adjacent the welding zone, for as shown in exaggerated fashion at 29 and 30 in Figure 5, it is only at the welding zone that the tube is deformed sufficiently by the electrodes to create a substantial pressure between the conductor bar 16 and the bases of the fin members. Throughout the remainder of the length of the conductor bar, the contact with the bases of the fin members is light and of such high resistance that there will be little current flow. This is indicated diagrammatically in Figure 5 by the clearance between the fin bases and the tube. The concentration of the current in this zone improves the efficiency of the welding operation, and furthermore, inasmuch as the flow of current is only directly across the conductor bar, the flow is the same throughout the welding operation even though the welding operation may be carried out continuously for a distance of several feet of tubing. Thus the impedance of the welding circuit does not change appreciably as the tube moves through the machines and accordingly the control of the welding current is simplified.

The determination of appropriate welding conditions for tubes of various sizes and gauges and fin members of various sizes and gauges may require some experimentation. However, the experimentation is well within the ability of the ordinary person skilled in the welding art, provided that he is guided by the principles disclosed herein. Thus the electrode pressures employed must be somewhat greater than those normally employed for the same sort of material, because part of the electrode pressure is used to deform the tube. The welding currents also must be somewhat greater than those ordinarily employed, because part of the current flowing between the electrodes is ineffective insofar as the welding is concerned, as it merely flows around the circumference of the tube. The following examples of successful welding practices will serve to guide those skilled in the art in practicing my invention:

Fins having a thickness of one-hundredth of an inch were welded to the interior of a tube of 20 gauge stock with an outside diameter of one inch, using a copper conductor bar one-eighth of an inch thick. The electrodes were one-eighth of an inch wide and eight inches in diameter. The electrode pressure was approximately 500–600 pounds. The welding was carried out with 60 cycle alternating current with an effective amperage of approximately 13,750 amperes at about six to eight volts. The current was thyratron controlled to flow during welding for two cycles after which the current was turned off for a period of five and a half cycles. The assembly of tube and fin members was progressed through the machine at a speed of approximately six feet per minute, producing a series of welded areas approximately the width of the conductor bar and spaced about five welds per inch.

Figure 6 shows a finned tube embodying my invention, but modified in that the tube is provided with both internal and external fins. Here the tube 30 has oppositely disposed pairs of internal fins 31 and external fins 32. One external fin is disposed on the exterior of the tube immediately adjacent the point of attachment of each internal fin. The operation of welding the internal and external fins to the tube is carried out much in the manner described heretofore with reference to the internal fins. In making this modified finned tube the tube is guided through the welding machine by a jig preferably constructed in accordance with the teachings of my Patent No. 2,298,249, and the internal fins are held in place by a mandrel or conductor bar 36 which may be similar in all material respects to the mandrel 16 heretofore described. As shown in Figure 7, the electrode rolls 18 and 19 of the welding machine engage within the outer fin members 32, and thus the flow of welding current between the electrodes will simultaneously weld the bases of four fin members to the tube. The operation may be carried out in the manner heretofore described. However, it is desirable further to limit the flow of current around the tube, and in order to carry out the welding operation most advantageously, the wall thickness of the tube for a given diameter should be less than the maximum thickness which can be employed when only internal fins are to be welded to the tube. Otherwise the difference between the amount of current flowing between the bases of the exterior fins and the tube and the amount flowing between the bases of the interior fins and the tube may be too great to permit the successful welding of both the interior and the exterior fins. Although this lesser thickness is preferable, in the following example satisfactory welds were obtained using a tube of the same thickness as that used when only internal fins were applied.

The following procedures have been found to be successful in simultaneously welding two interior and two exterior fins to tubes: Fins having a thickness of one-hundredth of an inch were welded simultaneously to both the interior and exterior of a tube of 20 gauge stock with an outside diameter of one inch, using a copper conductor bar 36 one-eighth of an inch thick where it was aligned with the electrodes. The electrodes were one-eighth of an inch wide and eight inches in diameter. The electrode pressure was approximately 500–600 pounds. As in the former example the welding was carried out with 60 cycle alternating current but with an effective amperage of approximately 17,750 amperes at about six to eight volts. Again, the current was thyratron controlled to flow during welding for two cycles after which the current was turned off for a period of five and a half cycles. The assembly of tube and fin members was progressed through the machine at a speed of approximately six feet per minute, producing a series of welded areas approximately the width of the conductor bar and spaced about five welds per inch.

In both forms of the method, after completion of one welding operation, the tube may be indexed with respect to the electrodes, additional fin members assembled with it as the case may be and the operation repeated to weld additional fin members to the tube. The operations are repeated until the desired number of pairs of fin members are secured to the tube.

Various other changes and modifications may be made without departing from the spirit and scope of my invention. It is therefore to be understood that my patent is not limited to the preferred forms of the invention described herein, or in any manner other than by the scope of the appended claims.

I claim:

1. The method of welding fins with a current conducting base portion to the inner surface of a current conducting tubular member which includes the steps of positioning within said tubular member an assembly comprising at least one fin with its base adjacent said inner surface and a conductor member adapted to extend across the interior opening in said tubular member to conduct a welding current from one region on the inner surface to another, said conductor member being formed of such material and so proportioned that it offers substantially less resistance to passage of current from one of said regions to the other than does said tube wall, positioning an external roller welding electrode over each of said regions at each end of said conductor member, forcing said tube wall inwardly and causing a welding current to flow from one electrode through one of said regions, the base of said fin, said conducting bar and said other region to the other electrode while said electrodes and said tubular member are moving relative to each other.

2. The method of welding fins with a current conducting base portion and an upstanding portion to the inside of a current conducting tubular member which includes the steps of positioning within said tubular member an assembly comprising two fins with their bases adjacent the inner tubular wall and a conductor bar adapted to conduct a welding current from one base to the other, positioning a roller welding electrode externally of said tubular member over the region of each of said bases, forcing the walls of said tubular member inwardly and causing a welding current to flow between said electrodes through the walls of said tubular member adjacent the base portion of said fin members, said base portions and said conductor bar while said electrodes and said tubular member move relative to each other.

3. The method of welding fins with a current conducting base portion and an upstanding portion to the inside of a current conducting tubular member which includes the steps of positioning within said tubular member an assembly comprising two fins with their bases adjacent the inner wall of said member and a longitudinally extending conductor bar of skeleton construction adapted to conduct a welding current from one base to the other, positioning an external roller welding electrode over the region of each of said bases, applying pressure by urging said electrodes toward each other sufficient to retain said conductor bar, fin bases and tubular member in current conducting relation and under welding pressure and causing a welding current to flow between said electrodes through the walls of said tubular member adjacent the base portion of said fin members, said base portions and said conductor bar while said electrodes are moving with a rolling motion over the tubular member.

4. The method of welding two oppositely disposed current conducting fins, each with a base portion and an upstanding portion, to the inside of a thin walled current conducting tubular member which includes the steps of positioning two fins within the tubular member opposite each other and with their base portions engaging the inner surface of the tubular member, inserting a conductor bar in said tubular member with opposite edges overlying said base portions, said conductor bar having a width slightly less than the distance between said fin bases, engaging the exterior of the tubular member in the regions lying immediately beyond the edges of said conductor bar by a pair of oppositely disposed electrodes, urging said electrodes toward each other to apply pressure sufficient to deform said tubular member inwardly toward its axis to cause said electrodes and said conductor bar to exert welding pressure against the bases of said fins and causing a welding current to flow between said electrodes through the walls of the tube and the base portions of said fins and through said conductor bar.

5. The method of welding current conducting channel section fin members to the inside of a thin walled current conducting tubular member which includes the steps of positioning a pair of channel section members within the tubular member with the base portions of the channel members engaging oppositely disposed portions of the inner surface of the tubular member, inserting a conductor bar in said tubular member with its opposite edges within the channel members, said conductor bar having a width slightly less than the distance between the bases of said channel members, engaging the exterior of the tubular member in the regions lying immediately outside of the zone of engagement of said base portions by a pair of oppositely disposed electrodes, urging said electrodes toward each other to apply pressure sufficient to deform said tubular member inwardly toward its axis to cause said conductor bar to exert welding pressure against the bases of said channel members and causing a welding current to flow between said electrodes through the walls of the tube and the base portions of said channel members adjacent the contact zones of said electrodes with the exterior of said tubular member and through said conductor bar.

6. The method of welding current conducting channel section fins to the inside of a thin walled current conducting tubular member which includes the steps of positioning a pair of channel section members within the tubular member with the base portions of the channel members engaging oppositely disposed portions of the inner surface of the tubular member, inserting a conductor bar in said tubular member with its opposite edges within the channel members, said conductor bar having a width slightly less than the distance between the bases of said channel members and a length corresponding to the length to be welded, engaging the exterior of the tubular member in the regions lying immediately outside of the zone of engagement of said base portions by a pair of oppositely disposed roller electrodes, urging said electrodes toward each other to apply pressure sufficient to deform said tubular member inwardly toward its axis and cause said conductor bar to exert welding pressure against the bases of said channel members, causing a welding current to flow between said electrodes through the walls of the tube and the base portions of said channel members adjacent the zones of contact of said electrodes with the exterior of said tubular member and through said conductor bar, and moving the assembly of tubular member, fin members and conductor with respect to said electrodes while said current is flowing to weld successive portions of the bases of said fin members to the tube as they reach the welding zone between the electrodes.

7. The method of welding axially extending current conducting fins with a base portion and an upstanding portion to both the inside and the outside of a current conducting tubular member which includes the steps of positioning within said tubular member an assembly comprising two fins with their bases adjacent the inner tubular wall and a longitudinally extending conductor member of skeleton construction adapted to conduct a welding current from one base to the other, positioning two fins on the exterior of said tubular member in axial registration with said first two fins, positioning an external welding electrode in the channel of each of said external fins and causing a welding current to flow between said electrodes through the walls of said tubular member adjacent the base portion of said fin members, said base portions and said conductor member.

8. The method of welding axially extending current conducting channel section members to both the inside and the outside of a thin walled current conducting tubular member which includes the steps of positioning a pair of channel section members within the tubular member with the base portions of the channel members engaging oppositely disposed portions of the inner surface of the tubular member, inserting a conductor bar in said tubular member with its opposite edges within the channel members, said conductor bar having a width slightly less than the distance between the bases of said channel members, positioning two channel section members on the exterior of said tubular member in axial registration with said first two channel section members, positioning an external welding electrode in the channel of each of said external channel section members, engaging the channel bottoms of said exterior channel section members in the regions lying immediately outside of the zone of engagement of said base portions by a pair of oppositely disposed electrodes, applying pressure by said electrodes sufficient to deform said tubular member to cause said conductor bar to exert welding pressure against the bases of said channel members and causing a welding current to flow between said electrodes through the walls of the tube and the base portions of all of said channel members adjacent the contact zones of said electrodes with the exterior of said tubular member and through said conductor bar.

JOHN W. BROWN, Jr.

REFERENCES CITED

The following references are of record in the file of this patent:

UNITED STATES PATENTS

| Number | Name | Date |
|---|---|---|
| 1,019,299 | Buchenberg | Mar. 5, 1912 |
| 1,995,368 | Sunnen | Mar. 26, 1935 |
| 2,057,017 | De Ganahl | Oct. 13, 1936 |
| 2,172,667 | Nelson | Sept. 12, 1939 |
| 2,261,136 | Brown | Nov. 4, 1941 |
| 2,261,137 | Brown | Nov. 4, 1941 |
| 2,298,249 | Brown | Oct. 6, 1942 |
| 2,298,250 | Brown | Oct. 6, 1942 |
| 2,324,435 | Smith | July 13, 1943 |